United States Patent [19]

Fagerburg

[11] Patent Number: 4,501,877
[45] Date of Patent: Feb. 26, 1985

[54] HIGHER MOLECULAR WEIGHT POLYESTERS FROM DIACID ANHYDRIDES AND CYCLIC ALKYLENE CARBONATES

[75] Inventor: David R. Fagerburg, Kingsport, Tenn.

[73] Assignee: Eastman Kodak Company, Rochester, N.Y.

[21] Appl. No.: 558,391

[22] Filed: Dec. 5, 1983

[51] Int. Cl.$^3$ .............................................. C08G 63/00
[52] U.S. Cl. .................................... 528/271; 528/370
[58] Field of Search ............................... 528/271, 370

[56] References Cited

U.S. PATENT DOCUMENTS 3,211,702  10/1965  Van Gijzen ........................ 528/271

Primary Examiner—Harold D. Anderson
Attorney, Agent, or Firm—Donald W. Spurrell; Daniel B. Reece, III

[57] ABSTRACT

Higher molecular weight polyesters are prepared from diacid anhydrides and cyclic alkylene carbonates by the process of first drying the reaction mixture either totally or at least substantially completely by azeotropic distillation of water using a suitable organic medium. The catalyst is then added and the polycondensation conducted as conventional. The polymers obtained are markedly higher in molecular weight than if the drying step is omitted, and the polycondensation period is dramatically shortened.

7 Claims, No Drawings

HIGHER MOLECULAR WEIGHT POLYESTERS FROM DIACID ANHYDRIDES AND CYCLIC ALKYLENE CARBONATES

The invention concerns an improved process for the manufacture of polyesters of inherent viscosities above about 0.1, preferably from about 0.2 to about 0.6. These polyesters include those, for example, prepared from phthalic anhydride and ethylene carbonate, and their copolyesters, and modifications thereof with various dicarboxylic acid anhydrides, and such polyesters having alkyl, aryl, or other substituted glycol repeat units. Such polyesters are useful, for example, as plasticizers, tackifiers and additive components for adhesive compositions.

Polyesters from glycols and diacid anhydrides, such as ethylene glycol and phthalic anhydride are well known in the art. It has previously been discovered that these polyesters can be prepared using a cyclic alkylene carbonate in place of the glycol. See, for example, U.S. Pat. No. 3,211,702. In the latter process in particular, however, molecular weights, as measured by inherent viscosity tend to be on the order of a few thousand. Attempts to polycondense these polyesters to higher molecular weights fail, apparently due to reforming of the anhydride.

In accordance with the present invention it has now been discovered that the molecular weights of such polyesters can be raised to the level of 5,000 (number average) or more (or more accurately, degrees of polymerization of 40 or more) if the reaction system is dried to a total water content of less than about 0.1% by weight and preferably below about 0.05% by weight, as measured by the Karl-Fischer titration method, to such low water content. Azeotropic drying by refluxing toluene or xylene are both very convenient for this purpose as they form lower boiling azeotropes and are thereafter removable under reduced pressure so as to leave little residual solvent which would be entrapped in the final polymer. Other suitable azeotroping agents may be used if desired. Additionally, the percent of opened anhydride rings, as determined via an acid number determination, should be less than 5.0 percent and preferably less than 1.0 percent. The calculation is made according to the following equation:

$$\frac{(\text{Acid No. in meq./g.})(\text{Anhydride mol. wt.} + 18)}{20} = \% \text{ Opened Rings}$$

The present invention is defined as the process for preparing polyesters of increased molecular weight, comprising reacting at from about 100° C. to about 230° C. a diacid anhydride component with a cyclic alkylene carbonate component, wherein the reaction system contains less than about 0.1% by weight of water and the percent of opened anhydride rings is less than 5.0 percent and preferably less than 1.0 percent, for a sufficient period to give an I.V. of above about 0.1. This process is further defined as including the preparation of the reaction system by refluxing the anhydride and carbonate component mixture in a solvent, for example, toluene and/or xylene for a sufficient period to azeotrope essentially all of the water present, and then separating the azeotrope therefrom.

The anhydrides useful in this invention can be either aromatic or aliphatic diacid anhydrides. They may be either unsubstituted or substituted. Subsituents may be alkyl or aryl or mixtures thereof containing up to 30 carbon atoms, or they may be polar groups such as chloro, fluoro, nitro, methoxy, ethoxy, and the like. Aliphatic diacid anhydrides may contain unsaturation but it may not be in conjugation with either or both of the carbonyl groups of the anhydrides. The unsaturation may also not be in a norbornyl ring structure. Typical anhydrides include succinic, phthalic, diphenic, naphthalic, tetrahydrophthalic, hexahydrophthalic and norbornanedicarboxylic. Preferred anhydrides are selected from phthalic anhydride, alkylphthalic anhydrides, nitrophthalic anhydride, halophthalic anhydrides, succinic anhydride, alkylsuccinic anhydrides, where the alkyl in either case above is straight or branched of up to 30 carbon atoms, anhydrides formed by Diels Alder reaction of maleic anhydride with dienes of up to 34 carbons, such as butadiene, isoprene, and cyclohexadiene, such anhydrides hydrogenated to remove the residual double bond as in the case of the reaction product of maleic anhydride with cyclopentadiene.

Carbonates useful in this invention include ethylene carbonate and ethylene carbonate monosubstituted with an alkyl substituent having no more than 5 carbon atoms and having at least one hydrogen on the carbon attached to the carbonate ring. Exemplary of such carbonates are propylene carbonate, 1,2-butylene carbonate, 1,2-hexylene carbonate, and isopropylethylene carbonate. The alkyl carbonates may all be prepared from the corresponding 1,2-diols and a dialkyl carbonate such as diethyl carbonate, or from the epoxide and carbon dioxide. The preparation, for example, of ethylene carbonate from ethylene oxide and $CO_2$ is described in U.S. Pat. No. 4,117,250.

Catalysts useful in this invention include from about 0.05 to about 5.0 mole % based on total moles of the carbonate reactant, of trialkylamines, quaternary ammonium salts, alkali metal hydroxides, alkoxides, and halides, alkali metal carboxylates, and also active metals such as sodium or potassium and metal hydrides such as sodium hydride or sodium borohydride. The category of active metals, hydrides, and the like, are more effective when used in conjunction with incomplete drying or drying to a stage where there remain at least some carboxylic acid groups from unclosed anhydride rings.

The trialkylamines useful herein have the formula $R_3N$ wherein the R alkyl groups are all the same or mixed and are linear or branched of up to about 18 carbons. Preferred are those wherein each R is selected from ethyl, propyl and butyl, and most preferably each R is butyl. It is desirable, in most cases, to employ trialkylamines having boiling points below the desired polycondensation temperature, i.e., below about 280°-285° C. in order to recover said amines for recycle. The tetraalkyl nitrogen substituted diamines have the formula $R^2R^3N-R^1-NR^4R^5$ wherein $R^1$ is straight or branched alkylene of 1-8 carbons, and each of $R^2$, $R^3$, $R^4$ and $R^5$ is independently selected from straight or branched alkyl of 1-8 carbons. The alkyl moieties $R^2$ and $R^3$ of the N,N'-dialkyl piperazine ($R^2-N-CH_2CH_2N'(R^3)-CH_2CH_2$), and the N-alkyl piperidine ($CH_2CH_2CH_2CH_2CH_2-N-R^2$) are as described above.

The quaternary ammonium salts (the term "salts", herein includes counterpart bases) useful herein have the general formula $(R^6)_4N^+X^-$, wherein each $R^6$ group is independently selected from linear or branched alkyl of 1–18 carbons, and one of which may be benzyl, and wherein the counterion X− may be hydroxide or a carboxylate anion from a carboxylic acid such as acetic, propionic, benzoic, and the like. It is preferred that each $R^6$ group not exceed 8 carbons, and it is particularly preferred that three of the $R^6$ groups are methyl and the other is a higher alkyl not exceeding 8 carbons, most preferably ethyl or butyl. Also particularly preferred is that each $R^6$ is ethyl or butyl, and also that three $R^6$ groups are ethyl and the remaining $R^6$ is benzyl. Such salts generally give excellent color in the final polymer.

A preferred group of specific amine components comprises triethylamine, tripropylamine, tri-n-butylamine, ethyltrimethylammonium hydroxide, tetraethylammonium hydroxide, benzyltriethylammonium hydroxide, propyltrimethylammonium hydroxide, butyltrimethylammonium hydroxide, tetraethylammonium bromide, tetraethylammonium acetate, tetrabutylammonium hydroxide, and benzyltriethylammonium hydroxide.

As aforesaid, concentrations of the amine component as low as about 0.05 mole % based on total moles of carbonate reactant generally provide a substantial rate increase over the uncatalyzed reaction. The preferred range for the trialkylamine and N-alkyl piperidine is 0.5 to 2.5 mole %, for the ammonium salt is 0.25 to 1.0 mole %, and for the tetraalkyldiamines and dialkyl piperazines is 0.25 to 1.25 mole %.

The mole ratio of the anhydride component to carbonate component should lie between 0.95 and 1.05 and preferably should lie between 0.98 and 1.02 for best results. Polymerization temperatures can be as low as about 100° C. but preferably are in the range of 150° C. to 230° C. to give reasonable reaction rates. Reactions are normally conducted at atmospheric pressure but reduced pressures may be used.

The inherent viscosities (I.V.) of the polycondensate (final polymer) herein and in the examples below are determined according to ASTM D2857-70 procedure, in a Wagner Viscometer of Lab Glass, Inc. of Vineland, N.J., having a ½ ml. capillary bulb, using a polymer concentration of 0.5% by weight in 60/40 by weight of phenol/tetrachloroethane. The procedure is carried out by heating the polymer-solvent system at 120° C. for 15 minutes, cooling the solution to 25° C. and measuring the time of flow at 25° C. The I.V. is calculated from the equation $$(n)_{0.50\%}^{25°C.} = \frac{\ln \frac{t_s}{t_o}}{C}$$

where:
(n)=inherent viscosity at 25° C. at a polymere concentration of 0.50 g/100 ml. of solvent;
ln=natural logarithm;
$t_s$=sample flow time;
$t_o$=solvent-blank flow time; and
C=concentration of polymer in grams per 100 ml. of solvent=0.50.

The units of the inherent viscosity in all examples given below are in deciliters/gram.

The invention can be further understood by reference to the following specific examples which are not intended to limit the invention, but merely to illustrate the same.

EXAMPLE 1

This example illustrates the present invention. In a 300 ml round-bottom flask were combined 37.0 g (0.25 mol) phthalic anhydride, 22.0 g (0.25 mol) ethylene carbonate, and 65 ml of toluene. The flask was fitted with a stirrer, a stopper, and a Dean-Stark trap which lead to a condenser and thence to a nitrogen source to maintain the mixture under an inert atmosphere. The flask was immersed in a 200° C. metal bath and held there for 15 minutes under heavy reflux of toluene. The trap was then drained of about 45 ml of toluene and azeotroped water. After an additional 10 minutes heating at 200° C., a partial vacuum was applied to a pressure of about 170 torr for 5 minutes. The mixture containing less than 0.1% by weight of water was then cooled. After solidification of the melt, the condenser was connected to a wet test meter to monitor gas evolution and 0.46 g (0.0025 mol) of tri-n-butylamine were added. The flask was reimmersed in the 200° C. molten metal bath and the melt stirred for 100 minutes. The viscous product, after cooling had an I.V. of 0.513.

EXAMPLE 2

This example illustrates the degree of polymerization expected from the prior art. The above example was repeated except for the azeotropic drying with toluene. The reaction was slower and needed 195 minutes to show a cessation of $CO_2$ evolution. The I.V. of the final product was 0.079. A repeat run was made using another source of phthalic anhydride and, after 160 minute reaction time, an I.V. of 0.093 was obtained.

EXAMPLE 3

This example further illustrates the present invention. The same reactants were used as in Example 1, but instead of tri-n-butylamine, 0.25 g of potassium acetate was used as the catalyst. Azeotropic drying with toluene was employed and the reaction was over in 55 minutes. The cooled product had an I.V. of 0.260.

EXAMPLE 4

The procedure and reactants of Example 1 were used, but the catalyst was 0.1 g of sodium methoxide. The final polymer had an I.V. of 0.370.

The invention has been described in detail with particular reference to preferred embodiments thereof, but it will be understood that variations and modifications will be effected within the spirit and scope of the invention.

I claim:

1. The process for preparing a polyester of increased molecular weight, comprising contacting in a reaction system at from about 100° C. to about 230° C. at least one diacid anhydride with at least one cyclic alkylene carbonate, wherein the reaction system contains less than about 0.1% by weight of water and the percent of opened anhydride rings is less than 5.0 percent, for a sufficient period to give an inherent viscosity of above about 0.1 as determined according to ASTM D2857-70 procedure, at 25° C. using a polymer concentration of 0.5% by weight in 60/40 by weight of phenol/tetrachloroethane.

2. The process of claim 1 wherein the anhydride is selected from phthalic anhydride, alkylphthalic anhydrides, nitrophthalic anhydrides, halophthalic anhydrides, succinic anhydride, alkylsuccinic anhydrides, anhydrides formed by Diels Alder reaction of maleic anhydride with butadiene, isoprene, or cyclohexadiene, or such anhydrides hydrogenated to remove the residual double bond, and wherein the carbonate is selected from ethylene carbonate or ethylene carbonate monosubstituted on the carbonate ring with an alkyl substituent having 1 to 5 carbons, provided the alkyl substituent has at least one hydrogen on the carbon which is attached to the carbonate ring.

3. The process of claim 1 wherein a catalyst in a concentration of from about 0.05 to about 5.0 mole % based on total moles carbonate reactant, selected from trialkylamines, alkali metal carboxylate salts, alkali metal alkoxides, hydroxides, or halides, alkali metals, or quaternary ammonium salts, is employed in the reaction system.

4. The process of claim 1 wherein less than about 0.05% by weight of water is present in the reaction system.

5. The process of claim 4 wherein the anhydride component contains at least about 50 mole % of phthalic anhydride, and the carbonate component contains at least about 50 mole % of ethylene carbonate.

6. The process of claim 1 wherein the reaction system is prepared by refluxing the anhydride and carbonate component mixture in a solvent selected from one or more of toluene or xylene for a sufficient period to azeotrope essentially all of the water present, and then separating the azeotrope therefrom.

7. The process of claim 6 wherein the anhydride component comprises one or more cyclohexane 1,2-dicarboxylic anhydride, phthalic anhydride, or succinic anhydride, the carbonate component comprises one or both of ethylene or propylene carbonate, the catalyst triethylamine or tributylamine is added to the reaction system, and the polymerization is carried out in the melt phase for a sufficient period to give an inherent viscosity of from about 0.2 to about 0.6.

* * * * *